United States Patent [19]
Perotto et al.

[11] Patent Number: 5,630,130
[45] Date of Patent: May 13, 1997

[54] MULTI-TASKING LOW-POWER CONTROLLER HAVING MULTIPLE PROGRAM COUNTERS

[75] Inventors: Jean-Félix Perotto, Colombier; Christian Lamothe, Neuchâtel, both of Switzerland

[73] Assignee: Centre Electronique Horloger S.A., Neuchatel, Switzerland

[21] Appl. No.: 290,954

[22] PCT Filed: Dec. 10, 1993

[86] PCT No.: PCT/EP93/03498

§ 371 Date: Aug. 22, 1994

§ 102(e) Date: Aug. 22, 1994

[87] PCT Pub. No.: WO94/15287

PCT Pub. Date: Jul. 7, 1994

[30] Foreign Application Priority Data

Dec. 23, 1992 [CH] Switzerland ............ 03935/92

[51] Int. Cl.$^6$ ........................... G06F 9/44
[52] U.S. Cl. ........... 395/677; 364/281.3; 364/281.7; 364/260; 364/247.5; 364/247.1; 364/948.11; 364/933.1; 364/933.4; 364/281.8; 364/DIG. 1
[58] Field of Search ............ 368/29, 107, 155, 368/250; 395/650

[56] References Cited

U.S. PATENT DOCUMENTS

| | | | |
|---|---|---|---|
| 3,940,745 | 2/1976 | Sajeva | 364/DIG. 1 |
| 4,502,790 | 3/1985 | Yokoyama | 368/200 |
| 5,237,700 | 8/1993 | Johnson et al. | 395/775 |
| 5,317,745 | 5/1994 | Chan | 395/700 |

FOREIGN PATENT DOCUMENTS 0364000  4/1990  European Pat. Off. .

OTHER PUBLICATIONS

"Introduction to Programmable Array Logic", Vincent J. Coli, BYTE, vol. 12, No. 1, Jan. 1987, pp. 207–219–see p. 207, left col., line 1; middle col., line 2 p. 208, right col., lines 8–10 p. 219, left col., lines 18–65.
Patent Abstracts of Japan, vol. 12, No. 266 (P–735) Jul. 26, 1988 & JP,A,63 052 241 (Hitachi Ltd) Mar. 5, 1988.
Patent Abstracts of Japan, vol. 7, No. 2 (P–166) Jan. 7, 1983 & JP,A,57 161 941 (Fujitsu KK) Oct. 5, 1982.
Patent Abstracts of Japan, vol. 6, No. 70 (P–113) May 6, 1982 & JP,A,57 008 853 (Mitsubishi Electric Corp.) Jan. 18, 1982.
Patent Abstracts of Japan, vol. 15, No. 5 (P–1149) Jan. 8, 1991 & JP,A,02 254 544 (Matsushita Electric Ind. Co. Ltd.) Oct. 15, 1990.

*Primary Examiner*—Kevin A. Kriess
*Assistant Examiner*—Lucien Toplu

[57] ABSTRACT

A multitasking controller comprising task storage means (2) for storing up to N tasks (P0,P1,P2,P3) each comprising a sequence of instructions, a microprocessor for processing, by time-sharing, a plurality of such N tasks, and a random access memory (12) for storing variable data created and used by said microprocessor. The microprocessor further comprises a scheduler (7) realized in hardware for controlling the use of said microprocess or by such processes, and program counter storage means for storing N program counters (Pc0,Pc1,Pc2,Pc3) each for use by the scheduler (7) is able select a different one of the program counters (Pc0,Pc1,Pc2,Pc3) when the task processed by the microprocessor is changed without the transfer of data from the random access memory (12). FIG. 1

12 Claims, 5 Drawing Sheets

MULTI-TASKING LOW-POWER CONTROLLER HAVING MULTIPLE PROGRAM COUNTERS

BACKGROUND OF THE INVENTION

This invention relates generally to multitasking controllers comprising a microprocessor for treating, by time-sharing, a plurality of tasks each comprising a series of instructions, task storage means, such as a ROM, for storing a number of said tasks, and data storage means, such as a RAM, for storing variable data created and used by said microprocessor. The multitasking controller is suitable for use in horological applications, and it will be convenient to hereinafter disclose the invention in relation to that exemplary application. It is to be appreciated, however, that the invention is not limited to that application.

DESCRIPTION OF PRIOR ART

Many applications in the horological field are based on tasks comprising a series of sequential instructions. A microcomputer is often used to perform such tasks and thus provide a watch with its desired functionality. Existing microcomputers comprise a read-only-memory or ROM for storing the instructions of each task to be performed, a microprocessor for performing the operations necessary to carry out these instructions and a random-access-memory or RAM for storing variable data created and used by the microprocessor. The microprocessor comprises notably an arithmetic-logic-unit or ALU for performing arithmetic and logic operations and a series of registers for storing the results of these operations. Control, data and address buses connect the microprocessor, ROM, RAM and an I/O interface so as to allow communication between these elements and the exterior environment.

The realization of such tasks using a microcomputer is often difficult to achieve due to the existence of several severe constraints. Not only must each of the tasks be performed in real time, but the microcomputer must react quickly to signals created either internally or from the user. Ideally, these tasks should also be structured and executed in a way which consumes as little power as possible.

Another challenge presented to watch designers is to reconstruct the operation of a number of watch functions, which are required to occur at the same time, with tasks that require the sequential performance of a series of instructions. For example, the action of a push-button on a watch may be required to simultaneously cause the operation of a stepper motor, whilst at the same time cause a chronograph to turn.

In order to address this problem, some watches have been designed in which microcomputers are used to perform several tasks concurrently by the technique of multitasking or time-sharing. In multitasking, a portion of each task in the ROM which must be performed is allowed use of the microprocessor in turn. Rapid cycling of the tasks executed makes it appear to the user that each task is being performed continuously and simultaneously with the other tasks.

The concurrent execution of tasks by a microprocessor is conventionally done by means of a software mechanism called a scheduler. Such a mechanism is realized as a series of instructions stored in a ROM, and manages the above sequencing of the diverse tasks performed by the microprocessor.

This manner of execution, although commonly used elsewhere in the computer industry, is nevertheless not well suited to the horological domain. The burden of the extra instructions introduced by the scheduler increases the effective size of the tasks performed by the microprocessor and equally reduces its performance in terms of speed and power consumption.

In order to minimize the reduction in processing speed resulting from the additional instructions which must be performed in task management, the size of the task portions performed in turn by the microprocessor are often made several instructions long so that tasks are changed as infrequently as possible. However, this reduces the reaction time of the watch to user inputs and other requests to initiate a task, which inputs and requests can only be acted upon after several instructions of another task have been executed.

Further, the execution of many of the tasks performed by the microprocessor also requires the execution of one or more sub-routines of instructions within that task. When a sub-routine is initiated from within a task in an existing multitasking controller, additional instructions are required so that the value of the program counter indicating the address of the instruction at which the task is to later recommence, after execution of the subroutine, can be firstly be saved in the RAM. The values in the accumulator register and index register may also be required to be saved. The extra instructions needed to perform these data transfer operations further increase the effective size of the tasks performed by the microprocessor and reduce its operating speed and power consumption.

It is an object of the present invention to provide a multitasking controller which alleviates or overcomes the disadvantages of the prior art.

SUMMARY OF THE INVENTION

With this object in mind, the present invention provides a multitasking controller comprising task storage means for storing up to N tasks each comprising a sequence of instructions, a microprocessor for processing, by time-sharing, a plurality of said N tasks, and data storage means for storing variable data created and used by said microprocessor, characterized in that said microprocessor further comprises a scheduler realized in hardware for controlling the use of said microprocessor by said processes, and program counter storage means for storing N program counters each for use by said scheduler to control the instruction sequence of a separate one of said N processes, so that said scheduler is able select a different one of said program counters when the task processed by said microprocessor is changed without requiring the transfer of data from said data storage means.

The provision of separate program counters for each task and a scheduler realized in hardware enables the more efficient management of the tasks treated by the microprocessor, by allowing the program counters to be changed without requiring the transfer of data to and from the data storage means which thus reduces the number of instructions stored in the ROM. The need to execute a number of additional instructions during the management of the tasks is avoided, thereby reducing the power consumption of the controller, increasing the speed with which the tasks are performed and enabling the size of the portions which treated by the microprocessor to be reduced. The tasks executed can also be cycled more rapidly, thus improving the response time of the controller.

Advantageously, the multitasking controller also comprises separate accumulator value storage means for storing a separate accumulator value for each task, so that the microprocessor is able to select a different one of said accumulator values, when the task treated by said microprocessor is changed, without requiring the transfer of data from said data storage means.

The multitasking controller may further comprise index value storage means for storing a separate index value for each of the tasks, so that said microprocessor is able to select a different one of said index values, when the task treated by said microprocessor is changed, without requiring the transfer of data from said data storage means.

In yet another embodiment of the present invention, the microprocessor is configurable so as to process a portion of each of X said tasks in turn, where 1<X<N, the program counter of one or more of the remaining N-X tasks being used by said microprocessor to control the instruction sequence of a sub-routine called from within said X tasks.

Thus, when the number of tasks required to be processed is less than the maximum number of tasks that the microprocessor can treated, the program counter of one or more of the remaining unused processes is able to be used to keep track of the instruction sequence of a sub-routine called from within in a task. The program counter which was in use when the sub-routine was called is thus retained for use when the sub-routine has been executed. The use of the scheduler of the present invention enables the minimization of both the data transfer required when the sub-routine is called and the number of additional instructions needed to perform this data transfer. As mentioned above, this reduces the power consumed by the controller, increases its response time and leads to the more efficient management of its tasks.

The following description refers in more detail to the various features of the multitasking controller of the present invention. To facilitate an understanding of the invention, reference is made in the description to the accompanying drawings where the multitasking controller is illustrated in a preferred embodiment. It is to be understood that the multitasking controller of the present invention is not limited to the preferred embodiment as illustrated in the drawings.

DETAILED DESCRIPTION

Figure 1:
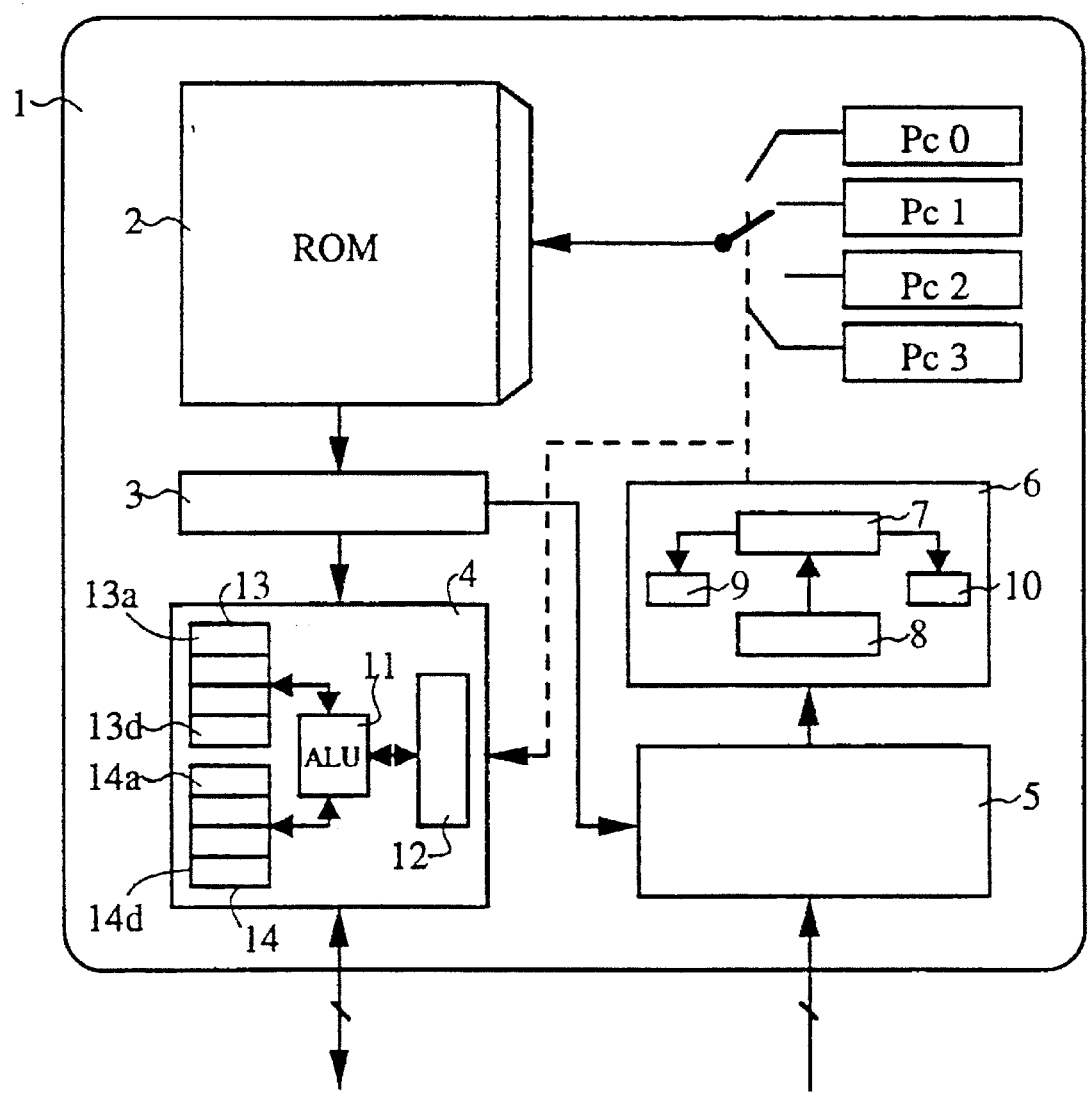
FIG. 1 is a schematic diagram illustrating the principle of operation of one embodiment of the multitasking controller of the present invention.

Referring now to FIG. 1, there is shown generally a multitasking controller 1 comprising principally a ROM 2, an instruction register/decoder 3, a resource group 4, an event bank 5, a task manager 6 and separate registers for storing each of four program counters Pc0, Pc1, Pc2 and Pc3. The ROM 2 stores the series of instructions of up to four tasks which are used by the controller 1 to perform desired functions. Each of these tasks uses a separate one of the program counters Pc0, Pc1, Pc2 and Pc3 to keep track of its instruction sequence. Each program counter is thus used to point to a memory location in the ROM 2 containing the next instruction within a task to be executed. It will appreciated that although four tasks and four corresponding program counters have been used in this embodiment, any number of tasks and corresponding program counters may be used in other embodiments of the invention.

Each of the tasks contained in the ROM 2 can be activated by an external event signal sent from a device peripheral to the controller 1 or by an internal event signal sent from within the controller 1. Many such signals may be provided to a multitasking controller used in an horological application. These event signals are sent to the event bank 5 which treats them in groups. The number of groups may correspond to the number of tasks stored in the ROM 2, although in other embodiments another number of groups be provided. Upon the receipt of any event signal from a particular group, the event bank 5 sends an event group signal to the task manager 6.

The task manager 6 comprises a scheduler 7, an event router 8 and two stack-pointers 9 and 10. The event router 8 receives each event group signal sent from the event bank 5 and generates a task request signal to request the initiation of one of the tasks stored in the ROM 2. The event router 8 may be configurable so that the task whose initiation is requested by each task request signal can be selected.

The scheduler 7 receives the tasks request signals sent from the event router 8 and manages the execution of each task thus requested. A portion of each active task (i.e. one whose initiation has been requested) is treated in turn by the controller 1 according to the task pointed to by the scheduler 7. As each task is executed, its program counter is used to keep track of which instruction in the ROM 2 is performed. When a portion of a first task has been executed, the scheduler 7 causes a portion of a second task to be treated by using the program counter of that second task to indicate the next instruction to be treated. As each task has its own program counter, the execution of each task can be easily suspended and then recommenced at the correct instruction.

In particular, the value of each program counter need not be transferred to and saved in a data register elsewhere in the controller 1 each time a portion of its corresponding task has just been executed, and transferred back to and stored in a common program counter each time a new portion of its task is to be executed. Advantageously, this enables one or more of the task portions executed by the controller 1 to be only one instruction long, so as to minimize the response time of the controller 1.

As will be explained later, one or more of the program counters may be used to initiate a sub-routine from within a task. When a sub-routine is called, the program counter currently in use is saved in order that the following instruction can be performed when the subroutine has been executed. The stack-pointers 9 and 10 are used to point to an unused program counter when a sub-routine is initiated, which program counter is then used to keep track of the instruction sequence in that sub-routine. The program counter in use when the sub-routine was called is thus preserved in order to keep track of the instruction sequence to be continued when the sub-routine has been executed.

The resource group 4 comprises an arithmetic logic unit or ALU 11, random access memory or RAM 12, an accumulator group 13 and an index register group 14. This latter group of registers is needed only if indexed addressing is used by the tasks executed by the controller 1.

The ALU 11 and the RAM 12 are shared resources and can be accessed by all tasks executed by the controller 1. Semaphores are used to control access to the shared resources of the controller 1 in the following manner. When a task uses a shared resource, a bit in a selected data register is set busy. When this task has finished using the shared resource, this bit is set free. The state of this bit is tested by all tasks wishing to access a shared resource, and if the bit has been set busy by earlier task, the later task must wait until the bit is set free.

The accumulator register group 13 consists of four accumulators 13a, 13b, 13c and 13d, whilst the index register group 14 consists of four index registers 14a, 14b, 14c and 14d. Together with the program counters Pc0 to Pc3, the accumulators 13a to 13d and the index registers 14a to 14d comprise resources within the controller 1 which are not able to be shared between the various tasks, but rather can be used by one particular task only in a given application.

When a current task is executed by the controller 1, the instruction to which the program counter being used by that process points is sent by the ROM 2 to the instruction register/decoder 3. Therein, the instruction is examined and its bits are transformed into a language understood by the ALU 11, data buffers, address buffers, timing circuits and various registers of the controller 1.

The ALU 11 receives decoded instructions from the instruction register/decoder 3 and performs the arithmetic or logic operations needed to carry out that instruction. The accumulator associated with the current task provides data to the ALU 11 so that these arithmetic or logic operations can be performed. The results of these operations are then returned to that accumulator. The RAM 12 is used to store data created and used in the performance of these operations.

The index register associated with the task currently being executed by the controller 1 is used to store an address employed by the task being executed as an offset value. A specified address is augmented by this offset value so as to point to another address in the controller 1 storing a desired operand for the ALU 11 or other required data.

The provision of a separate accumulator and, if needed, a separate index register for each task executed by the controller 1 thus enables each active task to use and keep its own accumulator and index values without requiring the transfer of data to and from the RAM 12 when the tasks are cycled within the controller 1.

As indicated above, the instruction register/decoder 3 also provides signals to the event bank 5 upon the occurrence of selected internal events within the controller 1.

The scheduler 7 is realized in the form of a hardware device, which is separate from the ROM 2 and RAM 12, so that the changing of tasks can be achieved without requiring the transfer of data involved in the storage and recall of the program counters, accumulator values and index values of each task in the RAM 12. A hardware device such as a hardwired finite state machine, programmable logic array, separate ROM, or other similar device may be used to realize the scheduler 7.

Figure 2:
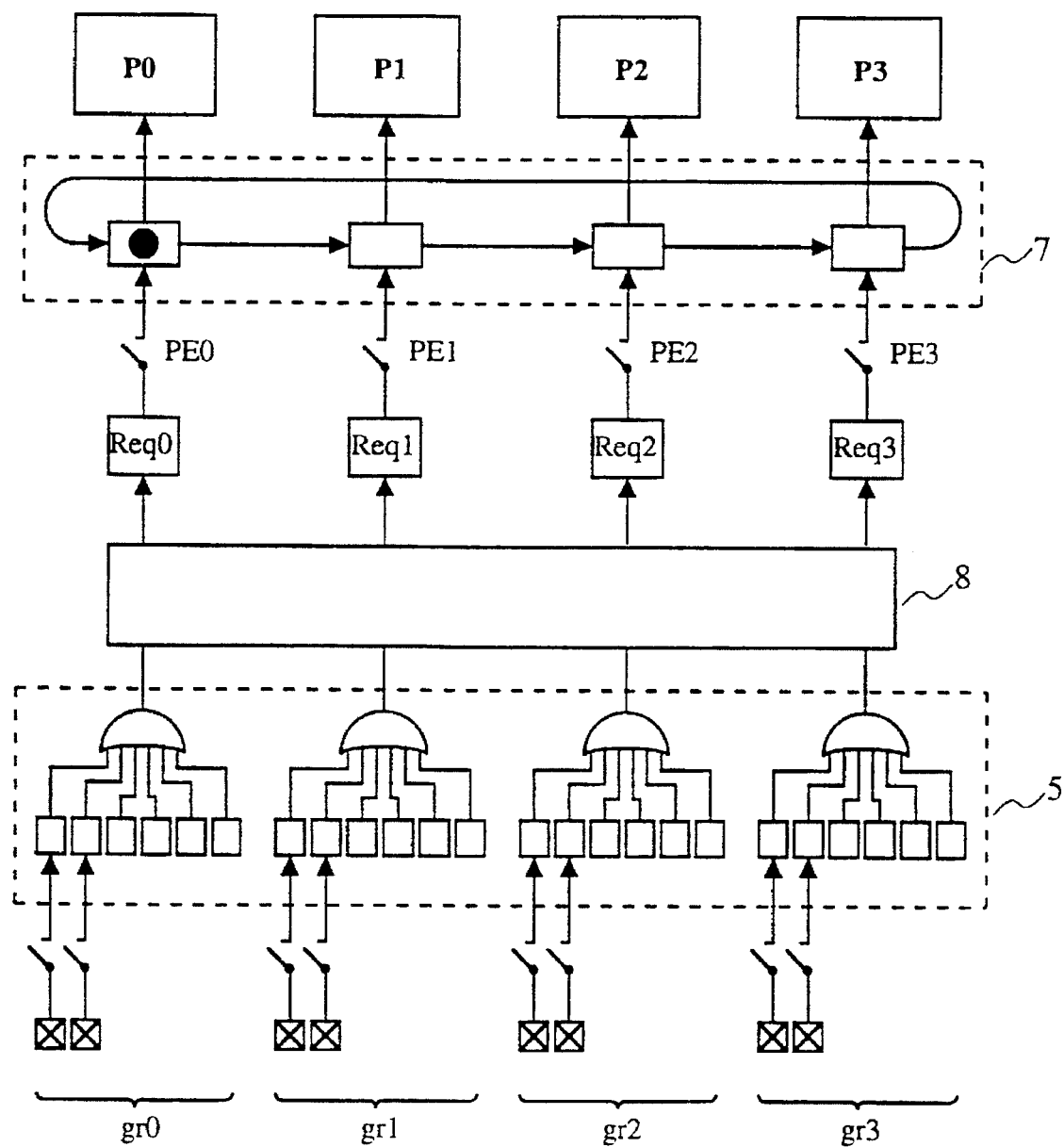
FIG. 2 is a schematic diagram illustrating the management of the processes treated by the multitasking controller of FIG. 1.
Figure 3A:
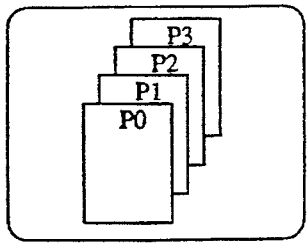
FIG. 3 is a schematic diagram illustrating the task configuration of the controller of FIG. 1 with respect to differing levels of sub-routines.
Figure 3B:
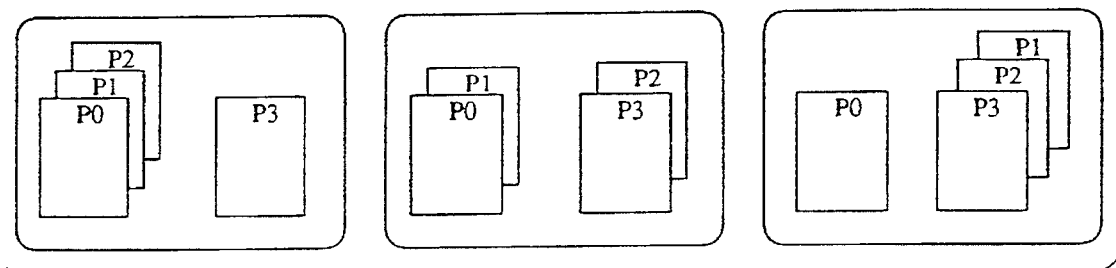
Figure 3C:
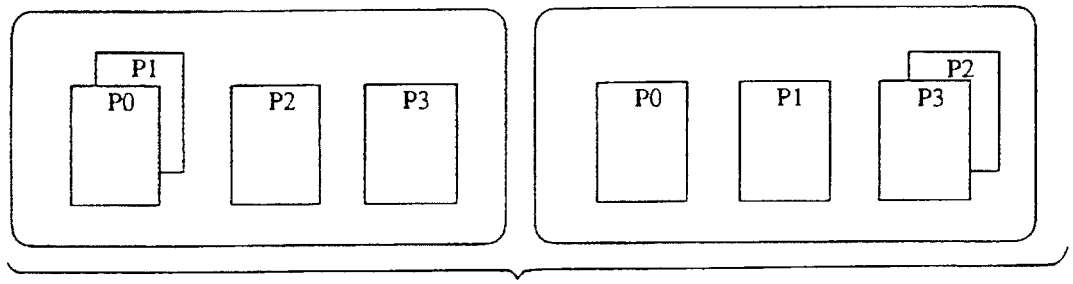
Figure 3D:
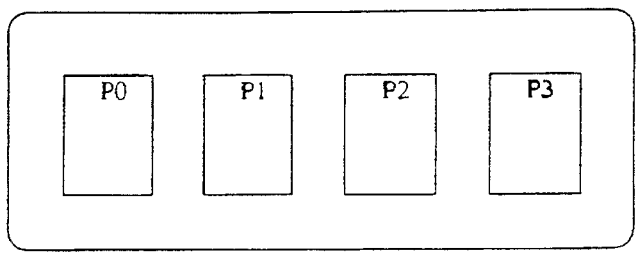

The management of the tasks stored in the ROM 2 by the controller 1 will now be explained in more detail. FIG. 2 shows schematically the event bank 5, the event router 8 and the scheduler 7 of FIG. 1. The four tasks which can be executed by the controller 1 are labelled P0, P1, P2 and P3. The scheduler 7 executes, in turn, an instruction of each active task according to a circular priority scheme. Thus, if each of the four tasks are active, the scheduler 7 executes sequentially one instruction of each task. If, however, only one task is active, the scheduler 7 executes sequentially the instructions of that task without any delay, and acting in this way as a monoprocessor.

The tasks P0, P1, P2 and P3 are each connected to the event router 8 by a separate bistable process enable switch, respectively labelled PE0, PE1, PE2 and PE3. Each of task is executed when a signal to request the initiation of a corresponding task is received from the event router 8. The task enable switches PE0, PE1, PE2 and PE3 either allow or prevent, depending upon their open or closed state, the tasks P0, P1, P2 and P3 to receive the task request signals Req0, Req1, Req2 and Req3 respectively. Under certain conditions, it may be desirable to prevent the access of a task request signal to the scheduler 7 by setting one or more of the task enable switches to an open state. For example, this facility may be used so that one task (e.g. a time adjustment function) is able to temporarily suspend the activity of one or more of the other tasks (e.g. the movement of the second hand). The task enable switches may be realized as individually settable bits within a data register in the task manager 6.

FIG. 3 represents some of the various ways in which each of the four tasks P0, P1, P2 and P3 may be used by the controller 1. In the case a), only the task P0 is active. As will be explained below, the non-shareable resources of the tasks P1, P2 and P3 are available to create levels of subroutines within the task P0 in this configuration.

In the case b), the tasks P0 and P3 are active. The non-shareable resources of the remaining two processes are in this case able to be used to create sub-routine levels, and can be shared in three different ways between the tasks P0 and P3. Firstly, the non-shareable resources each of the two tasks P1 and P2 may be used to call subroutines from within the task P0, whilst the task P3 has no sub-routine levels available to it. Secondly, the non-shareable resources of each of the two tasks P1 and P2 may be used to call subroutines from the process whilst the process P0 has no sub-routine levels available to it. Finally, each of the two active processes P0 and P3 can use the non-shareable resources of a different one the remaining two processes to call a single sub-routine level.

In c), three tasks are active and the non-shareable resources of the one remaining task are available for use in the calling of a sub-routine by either of the active tasks P0 or P3. In d), the four tasks P0, P1, P2 and P3 are each active and none of the non-shareable resources is available for use in the calling of sub-routines.

Figure 4A:
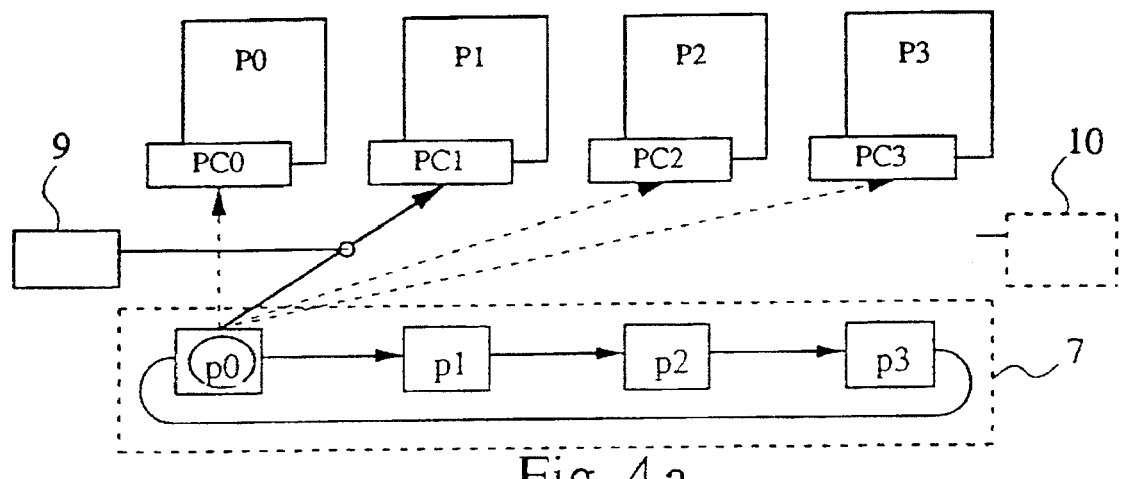
FIG. 4 is a schematic diagram illustrating the management of the sub-routines depicted in FIG. 3 by the controller of FIG. 1.
Figure 4B:
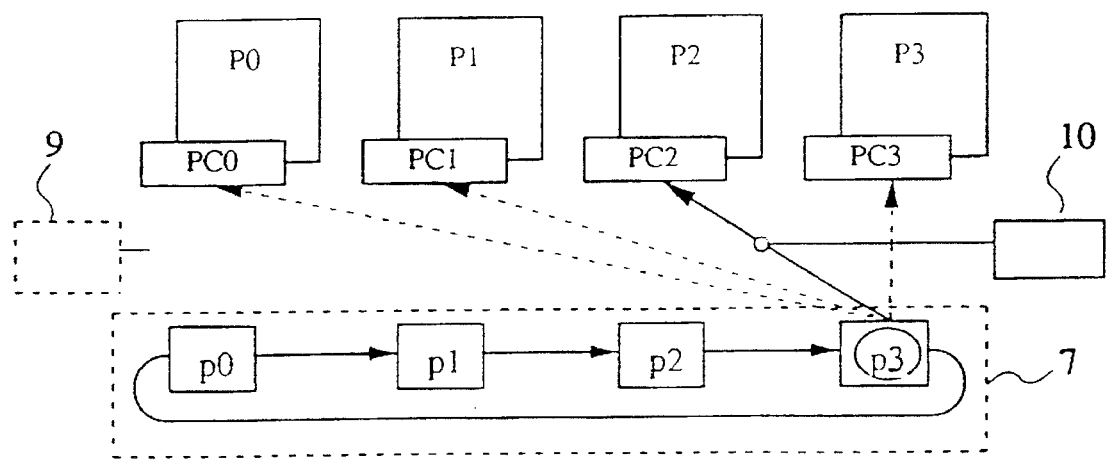
Figure 5A:
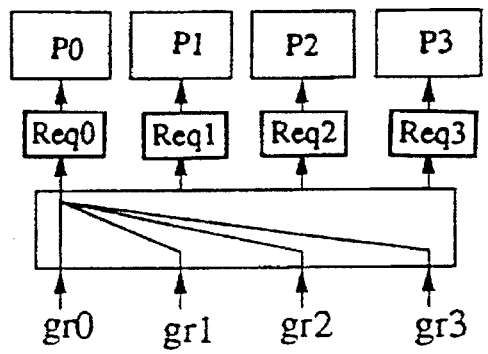
FIG. 5 is a schematic diagram showing the manner in which internal and external events are routed to and used to request initiation of the processes executed by the controller of FIG. 1.
Figure 5B:
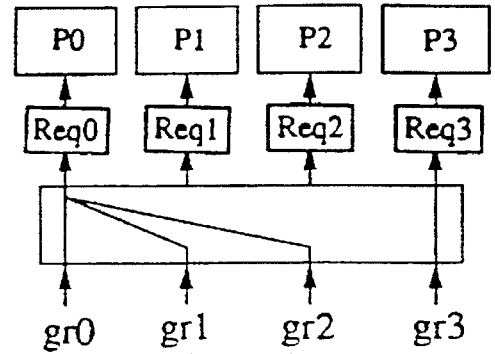
Figure 5C:
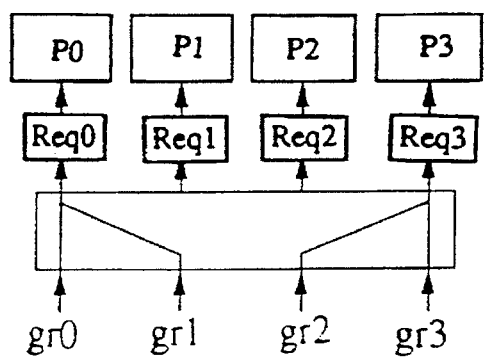
Figure 5D:
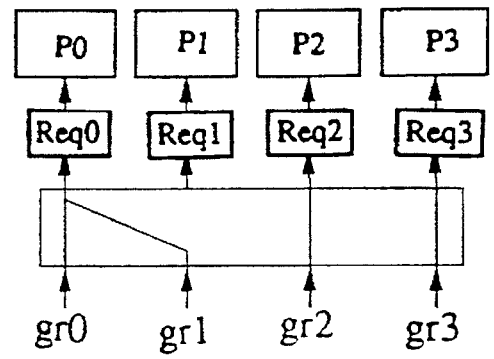
Figure 5E:
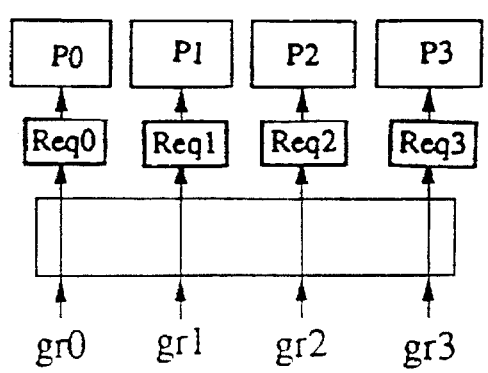

The management of the various tasks will be further explained in relation to FIG. 4, which shows the scheduler 7, the stack-pointers 9 and 10, the tasks P0, P1, P2 and P3 and their associated program counters Pc0, Pc1, Pc2 and Pc4 respectively. The controller 1 is adapted to execute branch control instructions, such as the instructions CALL and RETURN, which may appear in the series of instructions making up each of the four tasks P0, P1, P2 or P3.

In the embodiment of the invention illustrated in FIG. 4 a), it is possible to call sub-routines only from the task P0. The controller 1 is configured so that the stack-pointer 9 is attributed to the task P0. In this arrangement, the non-shareable resources of each of the tasks P1, P2 and P3, if available, can be used to call sub-routines within the task P0. The controller 1 is configured so that only the task enable switch PE0 is capable of being placed in a closed state, and thus only the task request signal Req0 is able to cause execution of the task.

The scheduler 7, in this example, is therefore always pointing to the task P0. At initialization, the stack-pointer 9 is set to point to the address at which the program counter Pc0 is stored. The execution of a branch control instruction, such as a CALL instruction, causes a series of instructions stored in the ROM 2 to be initiated as a sub-routine from within the task P0. As will by appreciated by those skilled in the art, a branch control instruction such as CALL instruction includes the starting address of the sub-routine to be initiated. When a sub-routine is initiated in such a task, the address from which the sub-routine was initiated is firstly augmented to indicate the return address following the branch control instruction at which the task will recontinue when the sub-routine has ended. The value of the stack-pointer 9 is then adjusted to point to one of the unused program counters (Pc1, Pc2 or Pc3). During the execution of the sub-routine, this previously unused program counter keeps track of the instructions executed in the sub-routine. When the execution of the sub-routine is finished, the stack-pointer 9 is readjusted to again point to the program counter Pc0 and the execution of the task is continued.

If more than one level of sub-routine is used, the value of the stack-pointer 9 is adjusted each time a new sub-routine is initiated to point to an unused program counter. In this manner, the controller 1 is adapted to initiate sub-routines from within a task without the need to store return addresses on a data stack in the RAM 12.

Preferably, the program counters Pc0, Pc1, Pc2 and Pc3 have consecutive addresses so that the stack-pointer 9 can be simply incremented when a return address is saved and decremented when the execution of a sub-routine has been completed.

Whilst a) in FIG. 4 shows an arrangement wherein all the non-shareable resources of the controller 1 are able to be used from within the task P0, the controller 1 may be configured differently depending upon the application. As shown in FIG. 3, the task P0 may use three, two, one or no other levels of sub-routines. In each of these cases, the stack-pointer 9 is only available for use in conjunction with the non-shared resources allocated to the task P0 in that configuration. For example, in a configuration wherein the task P0 uses the non-shareable resources of the task P1 to define a level of sub-routine, the stack-pointer 9 is only available for use with the program counter of the process P1.

In the embodiment of the invention illustrated in FIG. 4 b), the controller 1 is arranged so that the stack-pointer 10 is available for use within the task P3. In this arrangement, the stack-pointer 10 may thus be used to point to whichever of the program counters Pc2, Pc1 and Pc0 are used in such a task. It can be seen that in cases when each of the tasks P0 and P3 have one level of sub-routine, both of the stack-pointers 9 and 10 will be used.

Whilst the stack-pointers 9 and 10 have been described in relation to the tasks P0 and P3 only, in other embodiments one or both of these stack-pointers may be associated with other tasks. Similarly, other embodiments of the controller 1 may comprise additional stack-pointers associated with the tasks P1 and/or P2, so any number of the tasks P0, P1, P2 or P3 can use the non-shareable resources of other ones of the remaining tasks, if these resources are available, to call sub-routines.

As will be understood by those skilled in that art, an unlimited number of sub-routines and sub-routine levels can at the same time be attributed to each of the tasks P0, P1, P2 and P3 by the construction of a series of instructions which replicate the above described functions of a branch control instruction.

Returning now to FIG. 2, the management of the internal and external events received by the controller 1 and the creation of appropriate task request signals will now be described. The events which can be directed towards the event bank 5 are divided into four groups, labelled gr0, gr1, gr2 and gr3. These events are used by the controller 1 to commence the treatment of its different tasks. Six events are associated with each of these event groups, four of which are internal events and two of which are external events. For each one of these event groups, its six events are summed in the event bank 5 in an OR function so as to produce an event group signal. Thus, the arrival of any one of the six events of a particular event group causes the event bank 5 to produce an event group signal corresponding to that event group.

Each event group signal thus produced is sent to the event router 8 which produces a task request signal corresponding to one of the task P0, P1, P2 or P3, depending upon the configuration of the event router 8. Each task request signal is able to have either an active state, indicating the presence of one or more events directed towards a particular task, or an inactive state, indicating that no event directed towards that task is present.

When no event associated with a particular task request signal is present, it is possible to deactivate the task corresponding thereto. The execution of this task by the controller 1 is thus discontinued. When all of the task request signals are inactive, and accordingly no task is in execution, the controller 1 enters into a rest state where its power consumption is quasi-zero. However, when one or more events are present, the corresponding task request signal cannot be disactivated.

The various modes of configuration provided by the event router 8 are depicted in FIG. 5. Five such modes are possible in the present exemplary application. In mode 0, shown in a) of FIG. 5, all of the event group signals and therefore all of the events are directed towards the task P0. The multitasking controller 1 thus acts as a monoprocessor, sequentially executing the instructions of the task P0. The execution of the tasks P1, P2 and P3 cannot be requested by an event in the event bank 5, which thus frees each of the non-shareable resources of these tasks to enable sub-routines to be called from within the single task performed by the controller 1.

In mode 1, shown in b), the event group signals from the event groups gr0, gr1 and gr2 are directed towards the task P0, whilst event group signals from the event group gr3 are directed towards the task 3. The non-shareable resources of the tasks P1 and P2 are available for use in calling sub-routines from within the tasks P0 and P3. In mode 2, shown in c), the tasks P0 and P3 receive the task request signals caused by event group signals from the event groups gr0 and gr1, and from the event groups gr2 and gr3, respectively. Again, the non-shareable resources of the tasks P1 and P2 are available for use in calling sub-routines from within the tasks P0 and P3.

In mode 3, shown in d), the event group signals from event groups gr0 and gr1 are directed towards the task P0, whereas the event group signals from the event group gr2 are directed towards the task P2 and the event group signals from the event group gr3 are directed towards the task P3 exclusively. Only the non-shareable resources of the task P1 are available for calling a sub-routine. Finally, in the mode 4, shown in e), each of the tasks P0, P1, P2 and P3 receives the event group signal from the event groups gr0, gr1, gr2 and gr3 respectively. The user of the controller 1 is thus able to chose the mode of event routing which best corresponds to a particular application.

Finally, it is to be understood that various modifications and/or additions may be made to the multitasking controller 1 of the present invention without departing from the ambit of the present invention as defined in the claims appended hereto.

We claim:

1. A multitasking controller comprising:

task storage means (2) for storing up to N tasks (P0,P1, P2,P3) each comprising a sequence of instructions, a microprocessor for processing, by time-sharing, a plurality of said N tasks, and data storage means (12) for storing variable data created and used by said microprocessor, characterized in that said microprocessor further comprises a scheduler (7) realized in hardware for controlling the use of said microprocessor by said tasks, and program counter storage means for storing N program counters (Pc0,Pc1,Pc2,Pc3) each for use by said scheduler (7) to control the instruction sequence of a separate one of said N tasks, said scheduler (7) selecting a different one of said program counters (Pc0,Pc1,Pc2, Pc3) when the task processed by said microprocessor is changed without requiring the transfer of data from said data storage means (12), wherein said micro processor is configurable so as to process a portion of each of X said tasks in turn, where 1<X<N, the program counter of one or more of the remaining N-X tasks being used by said microprocessor to control the instruction sequence of a sub-routine called from within said X tasks.

2. A multitasking controller according to claim 1, characterized in that said microprocessor further comprises accumulator value storage means (13) for storing a separate accumulator value for each of said N tasks, for enabling said microprocessor to select a different one of said accumulator values, when the task treated by said microprocessor is changed, without requiring the transfer of data from said data storage means (12).

3. A multitasking controller according to claim 1 characterized in that said microprocessor further comprises index value storage means (14) for storing a separate index value for each of said N tasks, for enabling said microprocessor to select a different one of said index values, when the task treated by said microprocessor is changed, without requiring the transfer of data from said data storage means (12).

4. A multitasking controller according to claim 1, characterized in that said scheduler (7) comprises a hardwired finite state machine.

5. A multitasking controller according to claim 1, characterized in that said scheduler (7) comprises a programmable logic array.

6. A multitasking controller according to claim 1, characterized in that said scheduler (7) comprises a ROM.

7. A multitasking controller according to claim 1, characterised in that said microprocessor further includes one or more stack-pointers (9,10) each for controlling the use of said program counters (Pc0,Pc1,Pc2,Pc3) used in the processing of a separate one of said X tasks.

8. A multitasking controller according to claim 1, characterised in that said microprocessor further comprises an event router (8) for receiving an event group signal from a group of one or more event signals and producing a task request signal (Req0,Req1,Req2,Req3) corresponding to a selected one of said X tasks, said task request signal requesting said scheduler to execute said selected task.

9. A multitasking controller according to claim 8, characterized in that each said event signal consists of either an external event signal from a device peripheral to said controller or an internal event signal caused by said microprocessor.

10. A multitasking controller according to claim 9, characterized in that said event router (8) is adapted to receive event group signals from each of N groups (gr0,gr1,gr2,gr3) of event signals.

11. A multitasking controller according to claim 10, characterized in that said event router (8) is configurable so that a task request signal (Req0,Req1,Req2,Req3) corresponding to said selected task is produced in response to an event group signal received from one or more selected groups (gr0,gr1,gr2,gr3) of event signals.

12. A multitasking controller according to claim 2 characterized in that said microprocessor further comprises index value storage means (14) for storing a separate index value for each of said N tasks, for enabling said microprocessor to select a different one of said index values, when the task treated by said microprocessor is changed, without requiring the transfer of data from said data storage means (12).

* * * * *